H. A. AND W. H. MULLER.
AUTOMOBILE MUD SHOE.
APPLICATION FILED MAY 25, 1921.
1,410,072.
Patented Mar. 21, 1922.
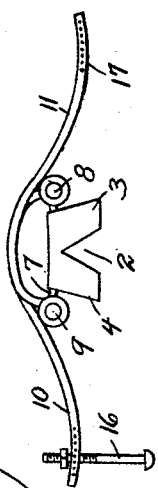
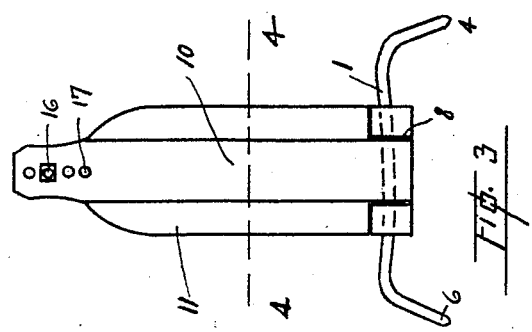
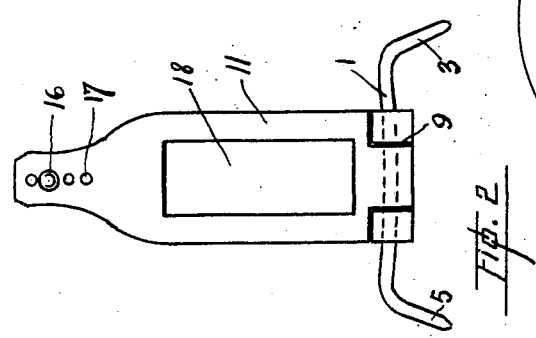
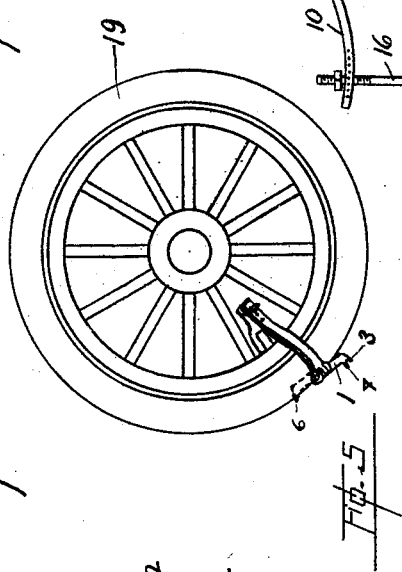
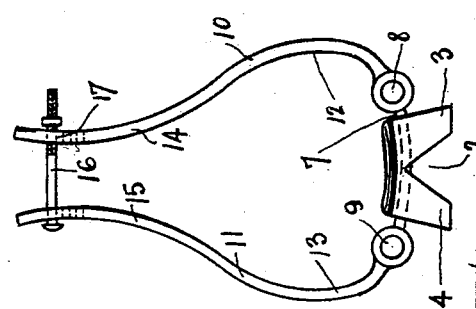
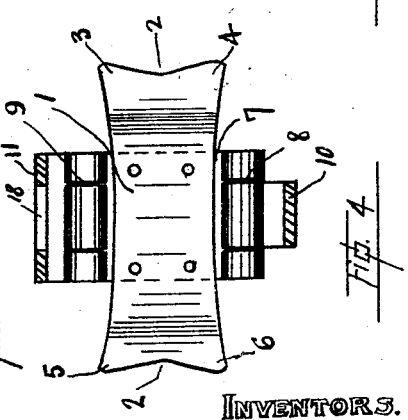
INVENTORS.
Herman A. Muller
William H. Muller.
BY
ATTYS.

UNITED STATES PATENT OFFICE.

HERMANN A. MULLER, OF POWELL RIVER, BRITISH COLUMBIA, CANADA, AND WILLIAM H. MULLER, OF SEATTLE, WASHINGTON.

AUTOMOBILE MUD SHOE.

1,410,072.     Specification of Letters Patent.     Patented Mar. 21, 1922.

Application filed May 25, 1921. Serial No. 472,393.

*To all whom it may concern:*

Be it known that we, HERMANN A. MULLER and WILLIAM H. MULLER, both subjects of the King of Great Britain, and residents, respectively, of Powell River, in the Province of British Columbia, Canada, and the city of Seattle, in the State of Washington, United States of America, have invented certain new and useful Improvements in Automobile Mud Shoes, of which the following is a specification.

Our invention relates to improvements in automobile mud shoes, and the object of our invention is to provide a device of this nature which is simple in construction and easy to handle and by the use of which automobiles or auto trucks may be raised out of mud holes, sandholes, or ditches in an expeditious and effective manner and which device may be folded up compactly when not in use so that it may fit into and be carried by the tool box usually found in any car or truck.

We attain this object by the construction illustrated in the accompanying drawings in which—

Fig. 1 is a front view of the device.

Fig. 2 is a side view.

Fig. 3 is a view of the side opposite to that shown in Fig. 2.

Fig. 4 is a sectional plan view taken through the line 4—4 of Fig. 3.

Fig. 5 is a view illustrating the practical application of our invention.

Fig. 6 is a view of the device as it will appear when folded.

Similar figures of reference indicate similar parts throughout the several views.

The device consists of a spring steel shoe of suitable dimensions having a base portion 1 the opposite ends of which are turned downwardly and bifurcated, as at 2, to form prongs 3—4 and 5—6. Secured rigidly to the base at its midlength and transversely of it is a plate 7 to the opposite ends of which are hingedly connected, as at 8 and 9, the lower ends of two hoops or arms 10 and 11, these arms being curved towards their lower ends as at 12 and 13 to fit over a tire while towards their upper ends they are reversely curved as at 14 and 15 so that they are brought closer together and thus they may be detachably connected by a bolt 16 passed through suitable holes 17 in the arms, a number of such holes being provided, as shown in Figs. 2 and 3, for the purposes of adjustment. 18 indicates a slot cut in the broad arm through which the narrow arm 11 may be passed to fold up the device when not in use.

The manner in which the device is used and operates will be readily understood on reference being had to Fig. 5, as it will be apparent that the arms may be passed over the sides of a tire, indicated by the numeral 19, and secured thereto by the bolt 16 to tightly embrace the same, when the shoe will then lie transversely of the tire, being positioned in advance of the vertical axis of the same so that when the tire is turned round in a forward direction under the power of vehicle itself the prongs 3—4 and 5—6 engage the ground and thus the device acts as a lever to raise the wheel as the turning movement is continued.

From the foregoing it will be seen that we have devised a simple, strong and inexpensive device for raising automobiles or trucks out of mudholes or the like by their own power and which enables the operation to be performed in a very quick and effective manner.

What we claim as our invention is:—

A device of the class described, comprising a traction plate adapted to be applied to the tread of a tire, arms hinged to said plate adapted to be secured together in embracing engagement with the tire to hold the plate in place, one of said arms being provided with a slot through which the other arm may pass to permit folding of the arms.

Dated at Powell River, B. C., this 7th day of May, 1921.

HERMANN A. MULLER.

Dated at Seattle, Wash., U. S. A., this 12 day of May, 1921.

WILLIAM H. MULLER.